(12) United States Patent
Van Erlach et al.

(10) Patent No.: US 11,468,473 B1
(45) Date of Patent: Oct. 11, 2022

(54) ELECTRONICALLY GENERATED PROMOTIONAL STRUCTURE DEPLOYMENT

(71) Applicant: FabFitFun, Inc., Los Angeles, CA (US)

(72) Inventors: Julian Van Erlach, Walnut, CA (US); Andreas Andrea, Los Angeles, CA (US)

(73) Assignee: FABFITFUN, INC., Los Angeles, CA (US)

( * ) Notice: Subject to any disclaimer, the term of this patent is extended or adjusted under 35 U.S.C. 154(b) by 0 days.

(21) Appl. No.: 17/451,840

(22) Filed: Oct. 22, 2021

(51) Int. Cl.
*G06Q 30/00* (2012.01)
*G06Q 30/02* (2012.01)
*G06Q 10/08* (2012.01)
*G06K 1/12* (2006.01)
*G06K 19/07* (2006.01)
(Continued)

(52) U.S. Cl.
CPC ......... *G06Q 30/0255* (2013.01); *G06K 1/121* (2013.01); *G06K 19/0723* (2013.01); *G06Q 10/0833* (2013.01); *G06Q 10/0838* (2013.01); *G06Q 30/0201* (2013.01); *G06Q 30/0269* (2013.01); *G06Q 30/0275* (2013.01);
(Continued)

(58) Field of Classification Search
CPC ........... G06Q 30/0255; G06Q 10/0833; G06Q 10/0838; G06Q 30/0201; G06Q 30/0269; G06Q 30/0275; G06Q 10/087; G06Q 30/0276; G06K 1/121; G06K 19/0723; G09F 3/0297
See application file for complete search history.

(56) References Cited

U.S. PATENT DOCUMENTS 8,175,908 B1   5/2012  Anderson
10,121,167 B2  11/2018 Deshpande et al.
(Continued)

OTHER PUBLICATIONS

- "Enhanced Services for Manufacturers and Partners: Supply Chain Management Tools Offering Visibility, Tracking, and Payment Services". IP.COM. 2009. (Year: 2009).*
(Continued)

*Primary Examiner* — Maria V Vanderhorst
(74) *Attorney, Agent, or Firm* — Schmeiser, Olsen & Watts, LLP

(57) ABSTRACT

A system, method, and computer program product for implementing electronically generated promotion deployment is provided. The method includes receiving electronic data comprising shipment identification for a shipment of an item from a shipping client to a recipient. A profile is generated for the recipient and a further client associated with a freight carrier is authorized to generate visible promotional structures associated with packages for delivery by the freight carrier. Promotional attributes from the further client are cross referenced with respect to a package comprising the item for the recipient. The cross referencing may include matching demographic profiles, of recipients of pending delivery packages, to additional profiles selected by a promotional entity for each pending delivery package. A visible promotional structure associated with the promotional attributes is generated and presented during delivery of the package. The visible promotional structure may include a physical structure or a digital structure.

24 Claims, 7 Drawing Sheets

(51) Int. Cl.
*G09F 3/00* (2006.01)
*G05B 19/418* (2006.01)

(52) U.S. Cl.
CPC ......... *G09F 3/0297* (2013.01); *G06Q 10/087* (2013.01); *G06Q 30/0276* (2013.01)

(56) References Cited

U.S. PATENT DOCUMENTS

| | | | |
|---|---|---|---|
| 10,417,669 | B2 | 9/2019 | Ho |
| 10,425,674 | B2 | 9/2019 | Kitts et al. |
| 2002/0124253 | A1 | 9/2002 | Eyer et al. |
| 2009/0177524 | A1 | 7/2009 | An |
| 2010/0265535 | A1* | 10/2010 | Friedman .......... G06Q 30/0239 358/1.15 |
| 2012/0047010 | A1 | 2/2012 | Dowling et al. |
| 2013/0346156 | A1* | 12/2013 | Ho .................... G06Q 30/0271 705/7.33 |
| 2015/0019384 | A1* | 1/2015 | Fabian ............... G06Q 30/0635 705/26.81 |
| 2021/0344742 | A1* | 11/2021 | Du ................... G06K 19/06037 |
| 2022/0101377 | A1* | 3/2022 | Bose ................. G06Q 30/0271 |

OTHER PUBLICATIONS

- "Development of the system and method for delivery using Radio Frequency Identification (I-BOX)". IEEE. 2016. (Year: 2016).*
Amazon seller central; Expiration dates on FBA products; https://sellercentral.amazon.com/gp/help/external/G201003420?language=en_US; retrieved from the Internet Oct. 18, 2021; 6 pages.

* cited by examiner

ELECTRONICALLY GENERATED PROMOTIONAL STRUCTURE DEPLOYMENT

BACKGROUND

The present invention relates generally to a method for configuring and deploying an electronically generated promotional structure and in particular to a method and associated system for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient. Typical current promotional practices include generating a promotion or purchase suggestion presented on a shopping Webpage of a shopping platform. The promotion or purchase suggestion is typically generated based on purchase history of a shopper. Typically, the aforementioned processes use a single source of data for generating a promotion and may be prone to inaccurate results with respect to a promotional type for presentation to a package recipient. Therefore, the method and associated system of the present invention is configured to enable a process for generating and presenting a physical or digital visible promotional structure associated with a package for delivery associated with a package recipient demographic profile thereby improving desired demographic targeting of delivery enhanced promotions.

SUMMARY

A first aspect of the invention provides a server of a freight carrier entity comprising a processor coupled to a computer-readable memory unit, the memory unit comprising instructions that when executed by the processor implements an order based electronically generated promotion configuration and deployment method comprising: receiving, by the processor, electronic data comprising shipment identification data for a shipment of at least one item from at least one shipping client to at least one recipient, a recipient name and address for the at least one recipient of at least one item, and description data associated with the at least one item; generating, by the processor based on the electronic data and records of items previously received by the at least one recipient, at least one profile for the least one recipient of the at least one item; authorizing, by the processor, at least one further client associated with the freight carrier to generate visible promotional structures associated with specified packages for delivery by the freight carrier; cross referencing, by the processor in response to the authorizing and based on analysis of the at least one profile, promotional attributes, from the at least one further client, with at least one package comprising the at least one item for the at least one recipient, wherein the cross referencing comprises: matching demographic profiles, of a plurality of recipients of pending delivery packages, to additional demographic profiles selected by at least one authorized promotional entity for each pending delivery package of the pending delivery packages; generating, by the processor for the at least one recipient, at least one visible promotional structure associated with the promotional attributes, wherein the at least one visible promotional structure comprises a physical structure attached to the at least one package or a digital structure configured to be presented to the at least one recipient via a hardware and software user interface; and presenting, by the processor to the at least one recipient, the at least one visible promotional structure during a delivery process of the at least one package.

Some embodiments of the invention further provide a server for receiving opt in instructions comprising permission enabling at least one additional client to generate promotions in association with the at least one package. Likewise, some embodiments of the invention are configured to generate and present the at least one visible promotional structure by enabling a Web-based tracking page associated with the at least one package. The Web-based tracking page may include a static tracking page or a dynamic tracking page. Alternatively, some embodiments of the invention are configured to generate and present the at least one visible promotional structure by generating a label including a visible promotion or a QR code associated with a visible promotion for presentation to the at least one recipient. The label is applied to the at least one package. Some embodiments of the invention are further configured to generate and present the at least one visible promotional structure by generating and transferring data to an RFID tag communicating with a mobile device for presenting the visible promotion to the at least one recipient via the mobile device. Likewise, some embodiments of the invention are configured to authorize item recipients and differing freight carrier entities to generate and present additional visible promotional structures associated with further specified packages for delivery by the freight carrier. Further embodiments of the invention are configured to enable entities to provide the at least one visible promotional structure to at least one profiled package recipient associated with further shipping clients and associated Web-based tracking pages. Still further embodiments may enable the generation of promotional structures for prior recipients not associated with in-transit packages via digital contact methods (e.g., email, phone numbers, etc.) available to freight carriers with respect to the prior recipients. Further embodiments may comprise receiving package content data from a shopping Web site accessible by the freight carrier and serving promotional structures to profiled recipients not associated with a delivery transaction based on established recipient profiles and served through digital recipient contact means. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A second aspect of the invention provides an order based electronically generated promotion configuration and deployment method comprising: receiving, by a processor of a server of a freight carrier, electronic data comprising shipment identification data for a shipment of at least one item from at least one shipping client to at least one recipient, a recipient name and address for the at least one recipient of at least one item, and description data associated with the at least one item; generating, by the processor based on the electronic data and records of items previously received by the at least one recipient, at least one profile for the least one recipient of the at least one item; authorizing, by the processor, at least one further client associated with the freight carrier to generate visible promotional structures associated with specified packages for delivery by the freight carrier; cross referencing, by the processor in response to the authorizing and based on analysis of the at least one profile, promotional attributes, from the at least one further client, with at least one package comprising the at least one item for the at least one recipient, wherein the cross referencing comprises: matching demographic profiles, of a plurality of recipients of pending delivery packages, to additional demographic profiles selected by at least one authorized promotional entity for each pending delivery package of the pending delivery packages; generating, by the processor for the at least recipient, at least one visible promotional structure associated with the promotional attributes, wherein the at least one visible promotional structure comprises a physical structure attached to the at least one package or a digital structure configured to be presented to the at least one recipient via a hardware and software user interface; and presenting, by the processor to the at least one recipient, the at least one visible promotional structure during a delivery process of the at least one package.

Some embodiments of the invention further provide a process for receiving opt in instructions comprising permission enabling at least one additional shipping client to generate promotions in association with the at least one package. Likewise, some embodiments of the invention are configured to generate and present the at least one visible promotional structure by enabling a Web-based tracking page associated with the at least one package. The Web-based tracking page may include a static tracking page or a dynamic tracking page. Alternatively, some embodiments of the invention are configured to generate and present the at least one visible promotional structure by generating a label including a visible promotion or a QR code associated with a visible promotion for presentation to the at least one recipient. The label is applied to the at least one package. Some embodiments of the invention are further configured to generate and present the at least one visible promotional structure by generating and transferring data to an RFID tag communicating with a mobile device for presenting the visible promotion to the at least one recipient via the mobile device. Likewise, some embodiments of the invention are configured to authorize item recipients and differing freight carrier entities to generate and present additional visible promotional structures associated with further specified packages for delivery by the freight carrier. Further embodiments of the invention are configured to enable entities to provide the at least one visible promotional structure to at least one profiled package recipient associated with further shipping clients and associated Web-based tracking pages. Still further embodiments may enable the generation of promotional structures for prior recipients not associated with in-transit packages via digital contact methods (e.g., email, phone numbers, etc.) available to freight carriers with respect to the prior recipients. Further embodiments may comprise receiving package content data from a shopping Web site accessible by the freight carrier and serving promotional structures to profiled recipients not associated with a delivery transaction based on established recipient profiles and served through digital recipient contact means. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A third aspect of the invention provides a computer program product, comprising a computer readable hardware storage device storing a computer readable program code, the computer readable program code comprising an algorithm that when executed by a processor of a server of a freight carrier entity implements an order based electronically generated promotion configuration and deployment method, the method comprising: receiving, by the processor, electronic data comprising shipment identification data for a shipment of at least one item from at least one shipping client to at least one recipient, a recipient name and address for the at least one recipient of at least one item, and description data associated with the at least one item; generating, by the processor based on the electronic data and records of items previously received by the at least one recipient, at least one profile for the least one recipient of the at least one item; authorizing, by the processor, at least one further client associated with the freight carrier to generate visible promotional structures associated with specified packages for delivery by the freight carrier; cross referencing, by the processor in response to the authorizing and based on analysis of the at least one profile, promotional attributes, from the at least one further client, with at least one package comprising the at least one item for the at least one recipient, wherein the cross referencing comprises: matching demographic profiles, of a plurality of recipients of pending delivery packages, to additional demographic profiles selected by at least one authorized promotional entity for each pending delivery package of the pending delivery packages; generating, by the processor for the at least recipient, at least one visible promotional structure associated with the promotional attributes, wherein the at least one visible promotional structure comprises a physical structure attached to the at least one package or a digital structure configured to be presented to the at least one recipient via a hardware and software user interface; and presenting, by the processor to the at least one recipient, the at least one visible promotional structure during a delivery process of the at least one package.

Some embodiments of the invention further provide a computer program product for receiving opt in instructions comprising permission enabling at least one additional shipping client to generate promotions in association with the at least one package. Likewise, some embodiments of the invention are configured to generate and present the at least one visible promotional structure by enabling a Web-based tracking page associated with the at least one package. The Web-based tracking page may include a static tracking page or a dynamic tracking page. Alternatively, some embodiments of the invention are configured to generate and present the at least one visible promotional structure by generating a label including a visible promotion or a QR code associated with a visible promotion for presentation to the at least one recipient. The label is applied to the at least one package. Some embodiments of the invention are further configured to generate and present the at least one visible promotional structure by generating and transferring data to an RFID tag communicating with a mobile device for presenting the visible promotion to the at least one recipient via the mobile device. Likewise, some embodiments of the invention are configured to authorize item recipients and differing freight carrier entities to generate and present additional visible promotional structures associated with further specified packages for delivery by the freight carrier. Further embodiments of the invention are configured to enable entities to provide the at least one visible promotional structure to at least one profiled package recipient associated with further shipping clients and associated Web-based tracking pages. Still further embodiments may enable the generation of promotional structures for prior recipients not associated with in-transit packages via digital contact methods (e.g., email, phone numbers, etc.) available to freight carriers with respect to the prior recipients. Further embodiments may comprise receiving package content data from a shopping Web site accessible by the freight carrier and serving promotional structures to profiled recipients not associated with a delivery transaction based on established recipient profiles and served through digital recipient contact means. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

The present invention advantageously provides a simple method and associated system capable of automating configuration and deployment of an electronically generated promotional structure.

DETAILED DESCRIPTION

Figure 1:
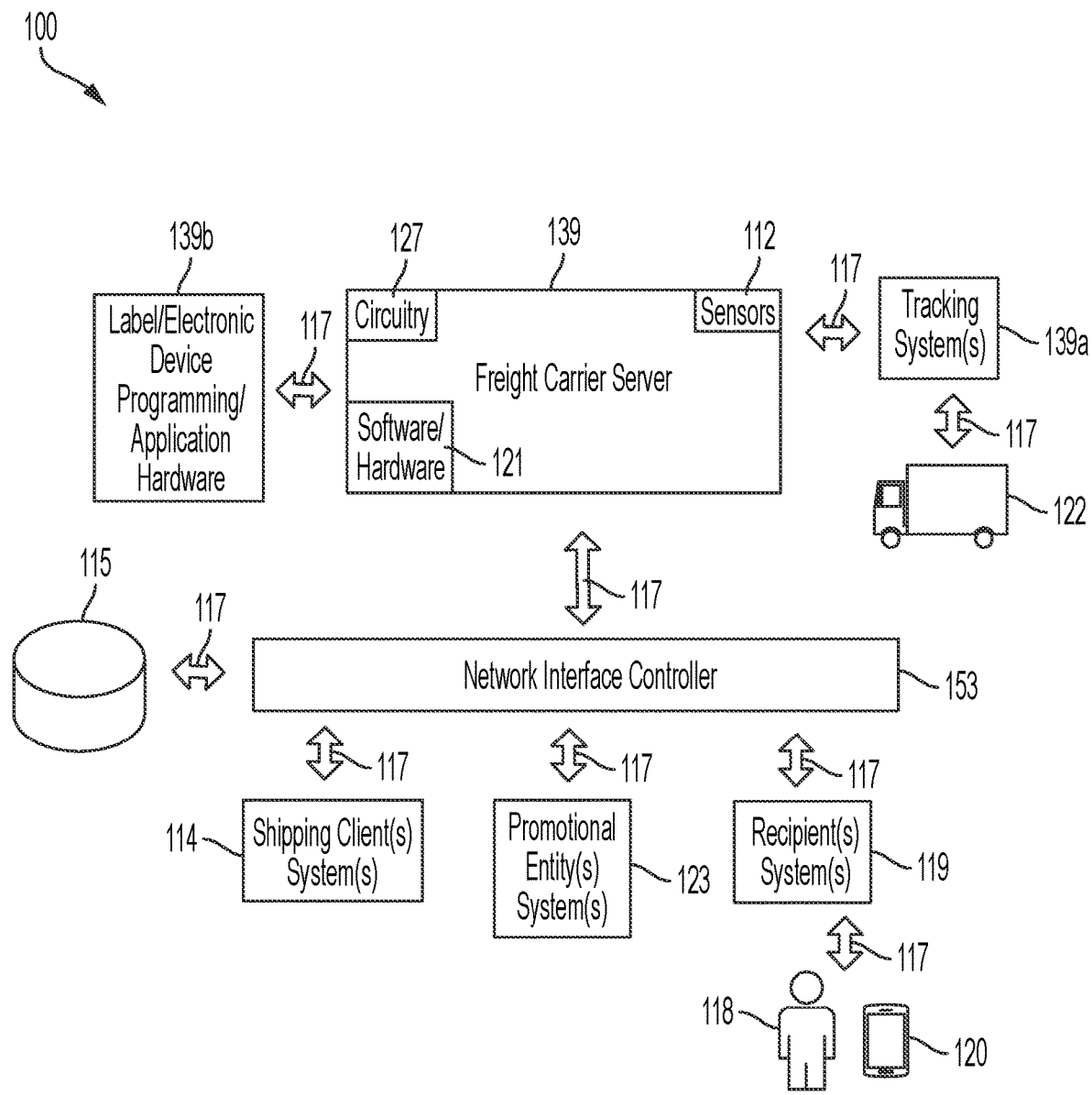
FIG. 1 illustrates a system for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.

FIG. 1 illustrates a system 100 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention. Typical advertising systems are associated with selecting a targeted advertisement based on a consumer advertising profile. Likewise, targeted information may be retrieved via usage of a personal information database and personal order sheets associated with previous orders of a user. Furthermore, typical processes for generating targeted advertisements may include methods for scanning an entire package to determine contents and generating promotions for placement on the package based on the scanned contents thereby potentially providing inaccurate results with respect to a promotional type for presentation to a package recipient. Therefore, the method and associated system of the present invention is configured to enable a process for generating and presenting a physical or digital visible promotional structure associated the package for delivery thereby improving an accuracy of delivery based promotions.

System 100 enables freight carriers to determine shipment order contents and build complex customer demographic profiles. Likewise, system 100 enables freight carrier clients to opt into a shipment order content system for specifying items being shipped in each order with respect to item/package recipients thereby enabling a freight carrier to generate recipient demographics and cross-promotional opportunities.

System 100 is configured to enable a process for allowing a freight carrier customer (i.e., a shipping client) to provide item descriptions (e.g., via a sku barcode, etc.) and/or categories of products (within a package) being sent to a freight carrier for shipping to a recipient. In response, the freight carrier may build a demographic profile of package recipients with respect to products received from multiple freight carrier customers. Subsequently, the freight carrier may cross-reference products (within a package) with respect to a package identifier (e.g., a bar code) and/or a package recipient name and/or address. The freight carrier may retrieve and accumulate shipment information and associate the shipment information with a recipient name and/or address.

System 100 further enables a freight carrier customer to permit additionally selected freight carrier customers to associate promotional offers to multiple shipped orders or to permit freight carrier-served digital promotions to digital contacts of profiled recipients of the a shipping customer. The additionally selected freight carrier customers are enabled to present promotions to package recipients specified within the demographic profiles (as describe, supra). Likewise, the freight carrier may attach a physical and/or digital (e.g., QR code, bar code, RFID tag, etc.) label (comprising the promotional offer) to a package comprising order contents. Additionally, the freight carrier may and may host the promotional offer digitally on an order tracking page. System 100 may further enable multi-vendor shopping platform operators or digital ecommerce wallet operators in addition to freight carriers. A digital ecommerce wallet operator may comprise an e-commerce checkout platform that retains an online shopper identity associated with a created account. The e-commerce checkout platform may allow a shopper to execute an online purchase with one enabling click across all member merchants (Instead of signing in to each individual merchant) Likewise, e-commerce checkout platform may be enabled to track online item selection and cart contents from each merchant. A digital ecommerce wallet operator may be configured to collect items selected by shoppers (or shopper shopping cart item contents) and perform promotion generation and presentation via digitally served offers to profiled shoppers.

System 100 of FIG. 1 includes a freight carrier server 139, a tracking system 139*a* (communicating with a shipping vehicle 122), programming/application hardware 139*b*, shipping client systems 114, promotional entity systems 123, (package) recipient systems 119, a database 115, and network interface controller 153 interconnected through a network 7. Freight carrier server 139 comprises sensors 112, circuitry/logic 127, and software/hardware 121. Programming/application hardware 139*b* comprises a hardware/software structure configured to generate a promotional label (e.g., a visible promotional label, a UPC label, a SKU label, etc.) and/or program an electrical device (e.g., an RFID tag) for presenting (visibly or electronically via e.g., a mobile device) a promotion to a package recipient. Likewise, programming/application hardware 139*b* comprises a hardware/software structure configured to apply (e.g., automatically via a robotic device) a promotional label (e.g., a visible promotional label, a UPC label, a SKU label, etc.) and/or an electrical device for presenting a promotion to a package recipient. Freight carrier server 139, tracking system 139*a*, programming/application hardware 139*b*, shipping client systems 114, promotional entity systems 123, and recipient systems 119 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, freight carrier server 139, tracking system 139*a*, programming/application hardware 139*b*, shipping client systems 114, promotional entity systems 123, and recipient systems 119 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Delivery vehicle 122 may include a memory system, software, video recording devices (e.g., a video camera), and motion control hardware (all sensors and associated control hardware for executing a process for directing delivery vehicle 122 to deliver a package to a specified location). Vehicle 122 may comprise any type of vehicle that includes a human operator located within vehicle 122 (e.g., an aircraft, an automobile or truck, a boat or ship, a train, etc.) for enabling a package delivery process. Alternatively, vehicle 122 may comprise any vehicle that does not require a human operator to be located within the vehicle 122 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable a vehicle to know it's location and self-determine a route to deliver a package to a location dynamically), a pre-programmed vehicle, etc. Vehicle 122 may include, inter alia, an aerial vehicle, a land-based vehicle, a marine (water) based vehicle, etc. Vehicle 122 may include sensors (within vehicle 122) including, inter alia, GPS sensors, temperature sensors, pressure sensors, cameras, infrared sensors, motion sensors, a microphone, optical sensors, a thermal imaging apparatus/sensor, optical and vibrational sensors, voltage sensors, RFID sensors, etc. Network 7 may include any type of network including, inter alia, a local area network, (LAN), a wide area network (WAN), the Internet, a wireless network, etc.

System 100 is enabled to execute a process for generating a printed or electronic structure for presenting a promotion as follows:

The process is initiated when a freight carrier receives (from a first shipping client via an opt-in interface) electronic data (associated with a package comprising products for shipment) including shipment IDs, package recipient names and addresses, and data indicating contents of packages (e.g., retrieved via an item bar code, a UPC, a sku structure, an item description, a category, etc.). Subsequently, the electronic data is utilized for generating a demographic profile for each package recipient. Additionally, an interface is presented (to the first shipping client) for enabling or disabling additional shipping clients to generate and present promotions on a package or associated shipment tracking page of the first shipping client. A subsequent cross referencing process may be executed as follows:

The associated shipment tracking page is cross referenced with (shipping client enabled) additional shipping clients enabled to present a promotion via a tracking page associated with a demographic of a package recipient associated with the tracking page. Likewise, available tracking pages are matched with a number of promotions desired by additional shipping clients with respect to matched package recipient demographics. A bidding process may be enabled with respect to selecting the additional shipping clients such that a relationship between a desired number of promotions exceeds available shipment tracking pages with respect to a specified interval of time. In response to the aforementioned cross referencing, a specified shipping client is enabled to present promotions on an associated tracking Webpage. The cross referencing process results in the generation of a promotion (e.g., in the form of a label comprising the promotion in a visible format, a QR code for communications with and promotion presentation to a mobile device of a package recipient, an RFID tag for communications with and promotion presentation to a mobile device of a package recipient, etc.) for placement on a package or an associated tracking page of the first customer.

System 100 additionally enables the following functionality:

1. Enabling a shipping client (e.g., via a specialized interface such as, inter alia, specialized hardware/software, a virtual reality interface, mobile device interface, etc.) to enter shipping package contents and/or item value (of shipping package contents) in combination with order/shipment data for generating a package recipient(s) profile.

2. Enabling a freight carrier to present promotion based on information within a package recipient(s) profile (via digital communications such as, inter alia, email, text message, encrypted digital communications, etc.). Likewise, a freight carrier is enabled to present promotions via package recipient communications (e.g., email, phone communications, etc.). Likewise, a freight carrier may be enabled to offer promotion placement to promotional entities unrelated to current freight carrier package shipments.

3. Enabling a reverse bidding process (initiated by shipping clients) to retrieve additional promotions and associated revenue such that a current supply of desired profiled recipients is greater than a demand for promotions (e.g., multiple shipping clients are associated with pending package recipients comprising similar profiles exceeding a promotion demand.

4. Shipping clients are enabled to provide recipient demographics for promotion presentation with respect to freight carrier generated package recipient demographics associated with multiple orders received by package recipients.

5. Shipping clients are enabled to select promotional entities for placement of promotions on packages or associated package tracking Webpages of a freight carrier(s) independent from whether a promotional entity comprises a shipping customer of the freight carrier presenting promotions. The freight carrier may select desired promotion placement with respect to authorized combinations of shipping clients associated with in-transit packages and promotional entities.

6. Enabling recipient profiling based on elements such as, inter alia, a category of package recipient purchases, a frequency of package recipient purchases, a value of package recipient purchases, an estimated home value of package recipients, an estimated income of package recipients, address data of package recipients, time series and rate of change data associated with package recipients, responses of package recipients with respect to previous promotions, specific types, quantities, or combinations of items or categories of items purchases/received over time, responses to previous freight carrier digital promotions unrelated to current package shipments, etc.

System 100 is configured deploy an electronically generated promotional structure as described in the following example process scenario:

The process is initiated when a freight carrier (e.g., a parcel service, a government postal service, etc.) builds and enables a hardware/software platform (e.g., freight carrier server 139, tracking system 139*a*, and programming/application hardware 139*b* of FIG. 1). Shipping clients A, B, and C (e.g., entities providing products for shipment to package recipients) are enabled to opt in (with the freight carrier) to provide the hardware/software platform with data describing item contents for each shipment being sent via the freight carrier. For example, shipping clients A, B, and C may opt in to provide (via a specialized computer interface application programming interface (API)) order identification data (for each shipment) such as, inter alia, an order number, a package recipient(s) name and address, item contents within each order including an item number, a universal product code (UPC), a product description, and a product category for each item.

In response, the freight carrier utilizes the order identification data to build package recipient profiles comprising items received (by the package recipient(s)) and/or package recipient addresses with respect to multiple orders executed via multiple shipper clients (e.g., shipping clients A, B, and C). Associated profiles (for the multiple shipping clients) may further include order weight(s), order dimensions, an estimated residence value of a package recipient(s), an estimated income of a package recipient(s), etc. An algorithm (implemented via specialized software code) may be enabled to generate profiles for package recipients with respect to, inter alia, product types received, a frequency of product receipt, categories of products received, a breadth and depth (i.e., volume) of items received across multiple categories, a number of shippers from which various product categories are received, etc.

The freight carrier may further enable shipping clients A, B, and C to allow alternative shipping clients to generate and apply promotional structures (e.g., a visible promotional label, a UPC label, a SKU label, etc. and/or an electrical device (e.g., an RFID tag) for presenting (visibly or electronically via e.g., a mobile device)) to packages of shipping clients A, B, and C. Likewise, the freight carrier may further enable shipping clients A, B, and C to allow the alternative shipping clients to generate promotions for presentation via Web based tracking pages for the packages or within email (e.g., confirmation email) or SMS (phone texts or messages) transmitted to recipients via the freight carrier. The freight carrier hardware/software platform may comprise and enable specialized filters for allowing shipping client A, B, and C to enable or disable promotions with respect to a name of a company or industry. Therefore (for any given package in transit by any given company), a number of additional companies may be enabled to promote in association with a package.

The freight carrier may further generate software programming code executed for matching desired package recipient demographics comprising potential promotional entities to available demographics of package recipients of in-transit packages. Furthermore, the potential promotional entities may require that promotional structures only be placed on packages of package recipients that are not current or past customers of the freight carrier. The aforementioned process may be executed by enabling the potential promotional entities to provide names and addresses to the freight carrier or by enabling the freight carrier to exclude package recipients of package shipments from the potential promotional entities by querying its own delivery archives. A subsequent matching process may be executed to compare an aggregate demand by package recipient profile type from multiple potential promotional entities to an available supply of promotions. Likewise, a bidding process may be executed to match a demand and supply of promotions. The bidding process may comprise a tiered process with respect to a relative association with any given package recipient profile. That association may comprise a function of breadth and depth of package recipient activity across desired product types or categories over time. Alternatively, association may comprise a function of a promotion response history tracked by the freight carrier hardware/software platform. A matching and bidding process may be further executed to target with respect to a promotion on a package or a digital promotion on a tracking Web page, etc.

When a promotion is matched to a package recipient, the hardware/software platform is enabled to monitor packages (for delivery) with desired promotions applied physically to the packages (e.g., via a physical promotion applicator such as programming/application hardware 139b) and directing the physical promotion applicator to apply the promotion to the package. Additionally, the hardware/software platform may be enabled to present desired promotions to: Web tracking pages of package orders in-transit to the targeted package recipients and/or in delivery confirmation emails, texts, or alternative digital means.

The hardware/software platform may further be enabled to: track promotion related behavior of package recipients; charge fees per type of promotion, and/or may enable revenue-sharing agreements with shipping clients allowing promotions. Associated data retrieved during the aforementioned process may enable additional services such as, inter alia, provisioning item or category aggregate demand data by geographic area, shipping client scoring capability for recipients, a recipient community based on a similarity of demand (e.g., recipients receiving similar categories of items), etc.

Shipping clients may additionally be provided with data describing a degree associated with any combination of shippers sharing recipient profiles or a degree to which shipping clients retain desired demographic recipient profiles of alternative shipping clients.

Figure 2:
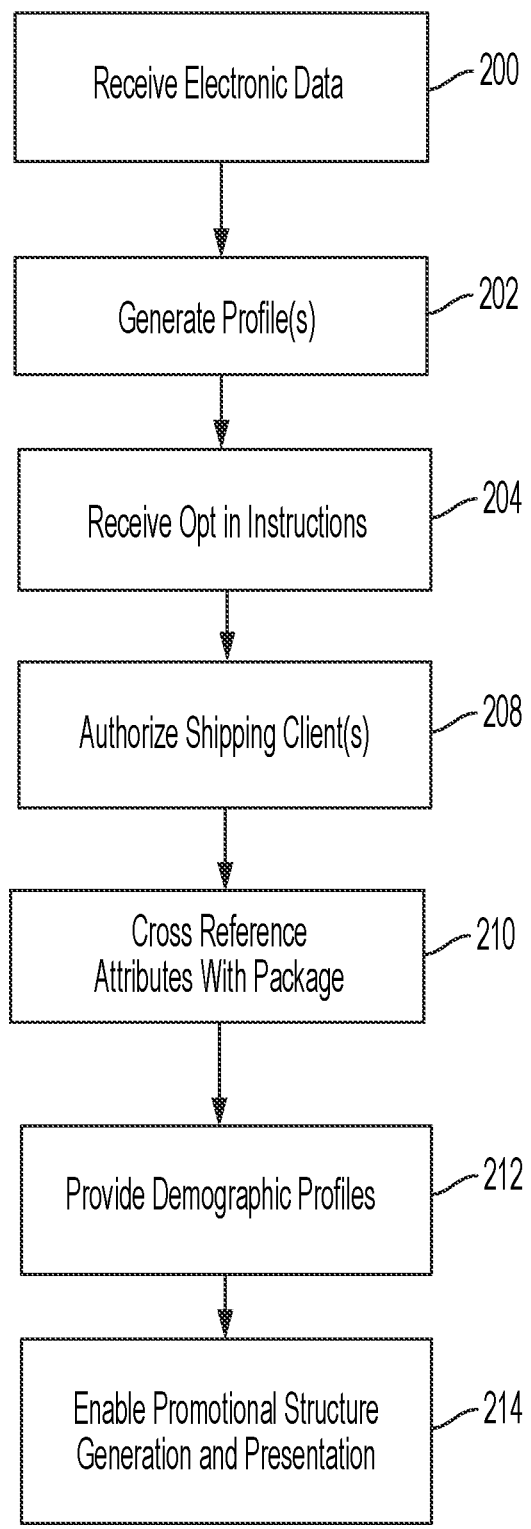
FIG. 2 illustrates an algorithm detailing a process flow enabled by the system of FIG. 1 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.

FIG. 2 illustrates an algorithm detailing a process flow enabled by system 100 of FIG. 1 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by freight carrier server 139, tracking system 139a, programming/application hardware 139b, shipping client systems 114, promotional entity systems 123, and recipient systems 119. In step 200, electronic data is received by a server of a freight carrier. The electronic data may be received from the freight carrier entity. The electronic data may be received from the freight carrier from a portal system(s) of the freight carrier. The portal system may include item order information associated with packages for package recipients or a carrier-operated imaging system configured to determine item attributes within a sealed package. The electronic data includes shipment identification data for a shipment of an item(s) from a shipping client(s) to a package recipient(s); a recipient name and address for the package recipient(s), and description data associated with the item(s). The description data may be comprised by a structure such as, inter alia, a bar code structure, a universal product number (UPC) structure, a stock keeping unit (SKU) code structure, a radio frequency identification (RFID) structure, etc.

In step 202, a profile(s) is generated for the package recipient(s) based on the electronic data retrieved in step 200. The profile may include data associated with a type of company of the shipping client(s), specified types of products associated with the shipping client(s), a size of packages received by the recipient(s), a weight of packages received by said the recipient(s).

In step 204, opt in instructions are received from the shipping client(s) via an interface (e.g., a hardware/software interface, a virtual interface, etc.). The opt in instructions may include permission for enabling an additional shipping client(s) (of the freight carrier) to generate promotions in association with packages being delivered by the freight carrier. The opt in instructions may further include permission enabling at least one additional shipping client of the freight carrier to generate promotions in association with the package(s).

In step 208, additional shipping clients (of the freight carrier) are authorized to generate visible promotional structures associated with specified packages for delivery by the freight carrier. In step 210, promotional attributes from the additional shipping clients are cross referenced (based on results of step 208 and in response to analysis of the profile(s)) with the package(s) comprising the item(s) for the recipient(s). The cross referencing process may include matching demographic profiles (of further recipients of pending delivery packages) to additional demographic profiles selected by at least one authorized promotional entity from at least one further shipping client for each pending delivery package. In step 212, the demographic profiles and additional demographic profiles are presented (or provided to) the shipping client(s) and the at least one further shipping client. In step 214, (at least one) visible promotional structure associated with the promotional attributes is generated for the recipients. The visible promotional structure may include a physical structure attached to the package(s) and/or a digital structure configured to be presented to the recipient(s) via a hardware and software user interface. The visible promotional structure may be presented to the recipient(s) during a delivery process of the package(s) or in a digital form at any time after the package recipient has been profiled. Additionally, a plurality of item recipients and a plurality of different freight carrier entities may be authorized (in response to instructions from the freight carrier entity) to generate and present additional visible promotional structures associated with further specified packages for delivery by the freight carrier to different recipients receiving shipped orders from the freight carrier entity. Additionally, entities (associated with further shipping clients) may be authorized to provide the visible promotional structure to a profiled package recipient(s) associated with the further shipping clients and associated Web-based tracking pages. Demographics of the profiled package recipient(s) are provided by the further shipping clients.

Generating the visible promotional structure may include any combination of the following processes:

Generating the visible promotional structure may include enabling a Web-based tracking page associated with the package(s) for allowing the at least one further shipping client to promote a demographic associated with the recipient(s) via the Web-based tracking page. Likewise, additional authorized Web-based tracking pages for packages may be matched to a number of promotional structures associated with the at least one further shipping client with respect to the demographic of the recipient(s). A resulting bidding process may be enabled. The bidding process is enabled for the shipping clients and the least one further shipping client with respect to visible promotional placement with respect to the package(s) such that a number of promotional structures in combination with visible promotional structure(s)

promotions exceeds a number of available Web-based tracking pages associated with the freight carrier over a given interval of time. Presenting the visible promotional structure may include presentation via the Web-based tracking page for tracking a vehicle associated with delivery of the package(s). The Web-based tracking page may include a static tracking page for providing static type tracking information for tracking the vehicle associated with delivery of the package(s). Alternatively, the Web-based tracking page may include a dynamic tracking page for providing dynamic real time continuously updating tracking information for the package(s). The visible promotional structure may include multiple differing promotions presented to the recipient(s) based on differing real-time locations of the vehicle associated with delivery of the package(s). The multiple differing promotions are associated with businesses located near to the differing real-time locations of the vehicle. Additionally, geographical information associated with the businesses may be retrieved from a database of known locations. The geographical information associated with the businesses may be detected via sensors of the vehicle as the vehicle is moving past the businesses.

Generating the visible promotional structure may include generating at least one label comprising a visible promotion for presentation to the recipient(s). Likewise, presenting the visible promotional structure may include applying the at least one label to the package(s). Applying the at least one label to the package(s) may include, inter alia, a manual process performed by a person, an automated process performed by a machine (e.g., a robotic device).

Generating the visible promotional structure may include generating at least one label comprising a QR code associated with a visible promotion for presentation to the recipient(s). Presenting the visible promotional structure includes enabling communications between the QR code and a mobile device(s) of recipient(s) such that the mobile device(s) present visible promotion to the recipient(s).

Generating the visible promotional structure may include generating data associated with a visible promotion for presentation to the recipient(s) and transferring the data to a RFID tag(s). Likewise, presenting the visible promotional structure may include applying said the RFID tag(s) to the package(s) and enabling communications between the RFID tag(s) and a mobile device(s) of the recipient(s) such that the mobile device(s) presents the visible promotion to the recipient(s).

Figure 3:
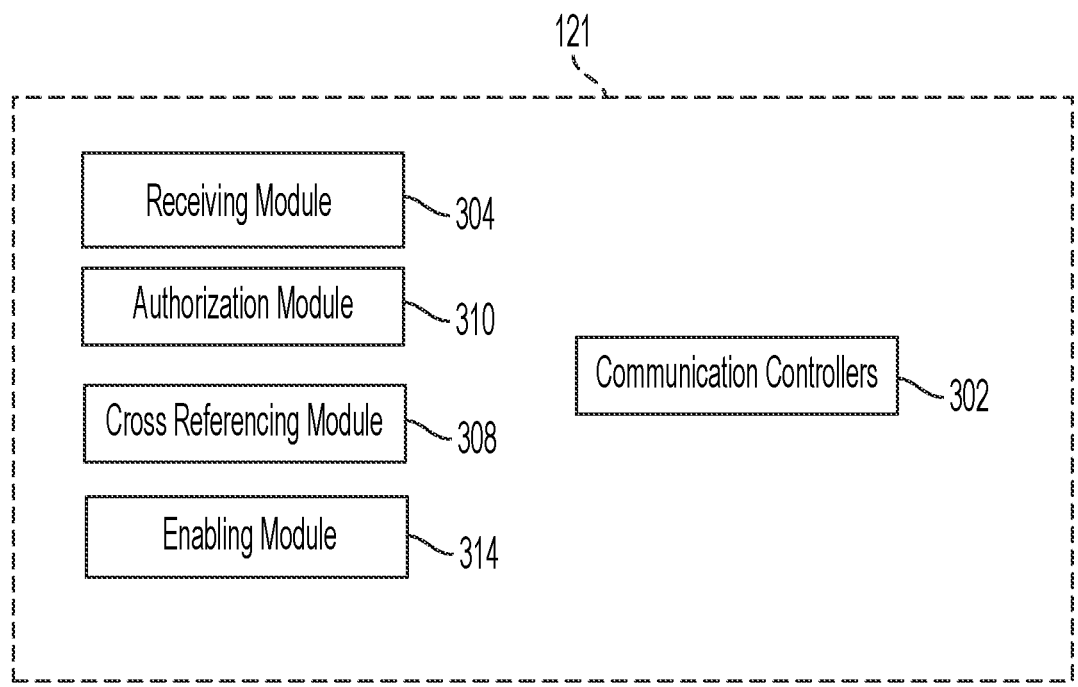
FIG. 3 illustrates an internal structural view of the software/hardware of FIG. 1, in accordance with embodiments of the present invention.

FIG. 3 illustrates an internal structural view of software/hardware 121 of FIG. 1, in accordance with embodiments of the present invention. Software/hardware 121 includes receiving module 304, an authorization module 310, a cross referencing module 308, an enabling module 314, and communication controllers 302. Receiving module 304 comprises specialized hardware and software for controlling all functions related to the receiving steps of FIG. 2. Authorization module 310 comprises specialized hardware and software for controlling all functionality related to the authorization steps described with respect to the algorithm of FIG. 2. Cross referencing module 308 comprises specialized hardware and software for controlling all functions related to the cross referencing steps of FIG. 2. Enabling module 314 comprises specialized hardware and software for controlling all functions related to the enabling and presentation steps of the algorithm of FIG. 2. Communication controllers 302 are enabled for controlling all communications between receiving module 304, authorization module 310, cross referencing module 308, and enabling module 314.

Figure 4:
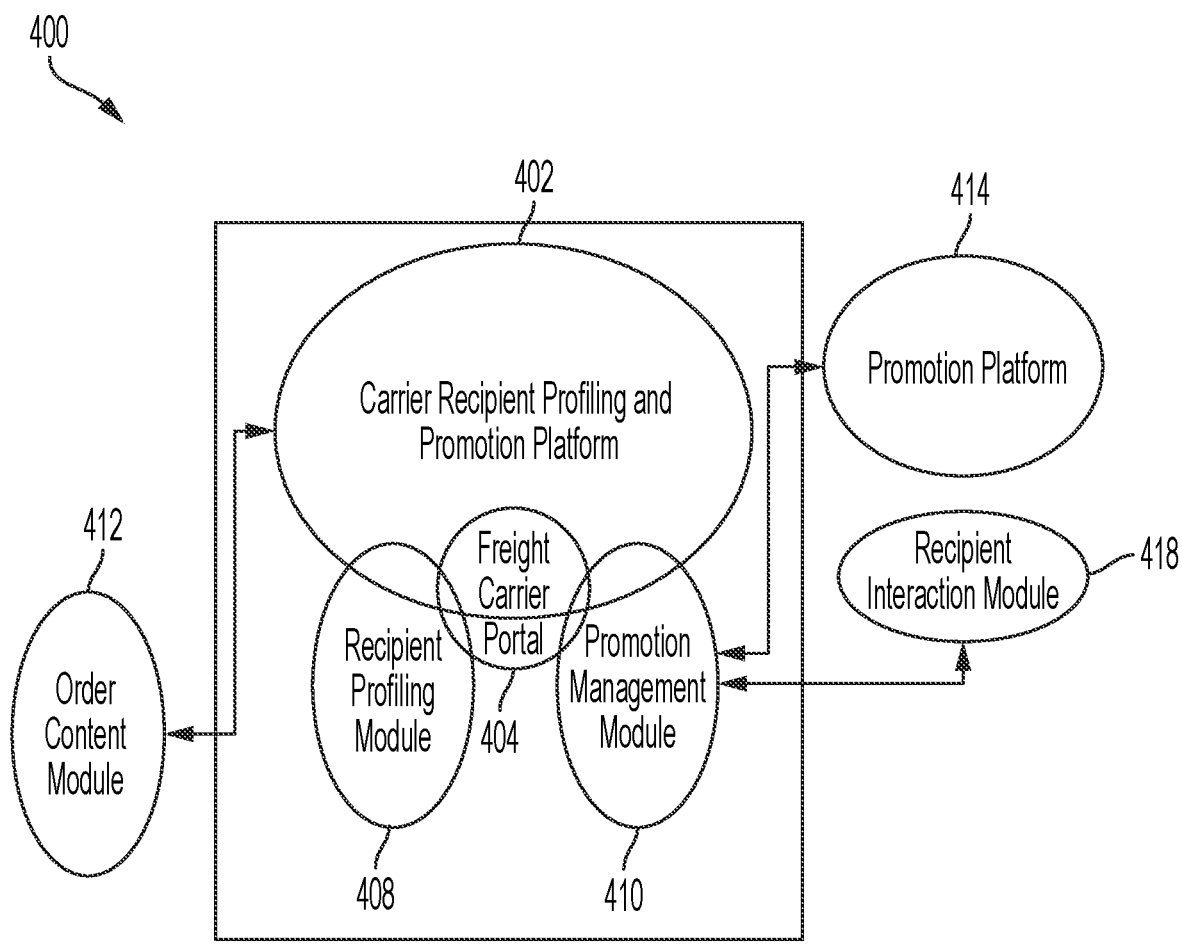
FIG. 4 illustrates a recipient order content-based demographic profiling and promotion system, in accordance with embodiments of the present invention.

FIG. 4 illustrates a recipient order content-based demographic profiling and promotion system 400, in accordance with embodiments of the present invention. System 400 comprises a carrier recipient profiling and promotion platform 402, a freight carrier portal 404, a recipient profiling module 408, a promotion management module 410, a shipping entity module 412, a promotion platform module 414, and a recipient interaction module 418. Carrier recipient profiling and promotion platform 402 is configured to store package recipient items and execute a profile process with respect to package recipients. Likewise, carrier recipient profiling and promotion platform 402 is configured to execute program code and associated rules and track recipient responses. Freight carrier recipient profiling and promotion platform 402 provides API, data, and reporting functionality for shipping entities. Freight carrier portal 404 is configured to enable a remote portal for package recipients placing orders from multiple merchants. Recipient profiling module 408 is configured to generate profiles for package recipients based on on items received from shipping clients and package recipient address related demographics. Promotion management module 410 is configured to execute a process for matching and tracking shipped orders with respect to shipping clients enabled to generate promotions. Promotion management module 410 is further configured to process promotional bids and select promotions associated with allowed orders. Likewise, promotion management module 410 is configured to control a process for applying a promotion to a package being processed on package sorters with respect to matched promotional entities. The promotion may additionally be presented with respect to an order tracking Webpage and results may be stored in a memory structure. Shipping entity module 412 is configured to provide opt-in functionality with respect to a package order, order contents, permitted promotion provision with respect to: an electronic file API, a package recipient address and name, a package order ID, and permitted or blocked promotional entities. Promotion platform module 414 is configured to provide a platform desired recipient demographic. Recipient interaction module 418 is configured to place a promotional structure on a package and present the promotion via a Web tracking age, an SMS, an email etc.

Figure 5:
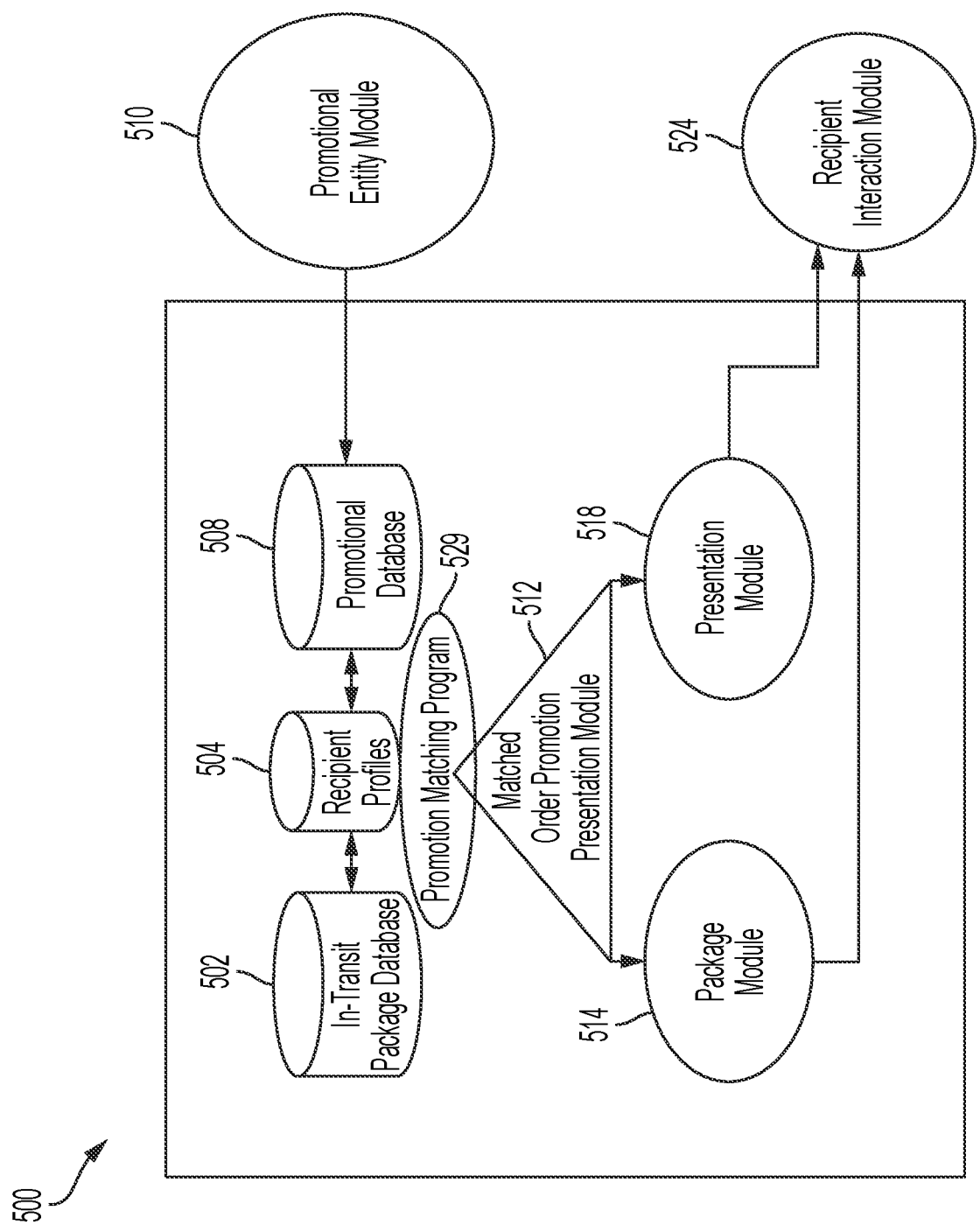
FIG. 5 illustrates a package recipient promotion generation system, in accordance with embodiments of the present invention.

FIG. 5 illustrates a package recipient promotion generation system 500, in accordance with embodiments of the present invention. System 500 comprises an in-transit package database 502 a recipient profile database 504, a promotional database 508, promotion matching program code 529, a matched order promotion presentation module 512, a package module 514, a presentation module 518, a promotional entity module 510, and a recipient interaction module 524. In-transit package database 502 is configured to store data describing in-transit packages being shipped via a freight carrier entity. Each of the packages is associated with at least one promotional entity. Recipient profile database 504 is configured to store package recipient profiles. Promotion matching program code 529 comprises software code configured to control all functionality of system 500. Promotional database 508 is enabled for storing desired package recipient profiles, an associated quantity of packages delivered, price offers for packages, and package order time windows. Matched order promotion presentation module 512 is configured to control all functionality associated with matching promotions with package orders. Package module 514 is configured to control functionality for applying a physical promotional structure (e.g., a label such as a visible promotion or a QR code, a RFID tag etc. The physical promotional structure may be applied to the package at a specified location on the package. Package module 514 may be further configured to track a package physically to a label printer or to a QR code or RFID tag programming unit. Presentation module 518 is configured to present a specified promotion to a package recipient via, inter alia, a Web based tracking Page, a SMS, an email, etc. Promotional entity module 510 may be associated with a shipping entity. Alternatively, promotional entity module 510 may be associated with a non-shipping entity. Promotional entity module 510 is configured to provide a specified recipient demographic, a quantity of packages for delivery, a package delivery time window, a price or bid per promotion, current customer IDs, etc. Recipient interaction module 524 is configured to control and monitor package recipient interaction with physical and digital promotional structures.

Figure 6:
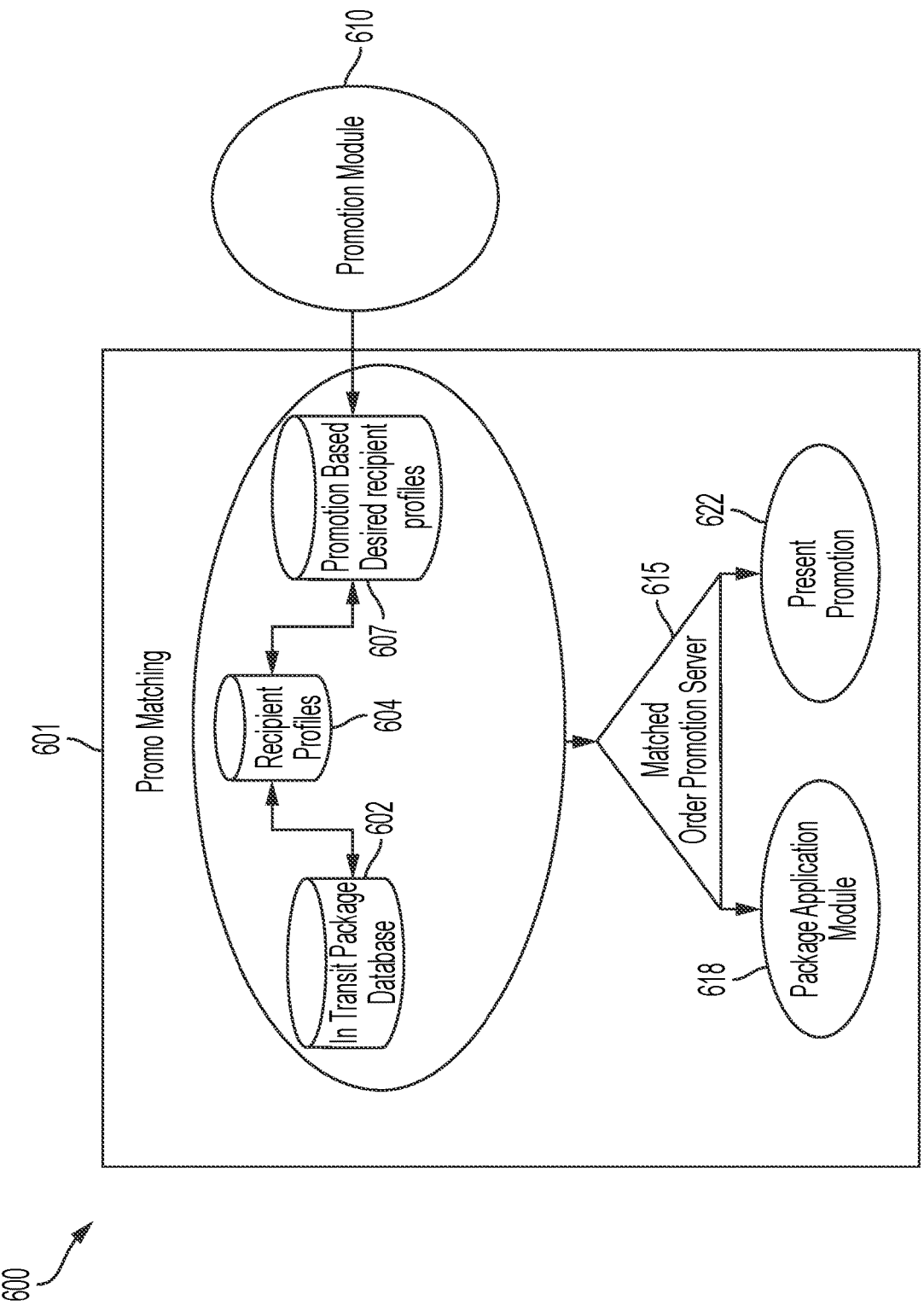
FIG. 6 illustrates the cross referencing system of FIG. 1, in accordance with embodiments of the present invention.

FIG. 6 illustrates a cross referencing system 600 of FIG. 1, in accordance with embodiments of the present invention. System 600 comprises an in-transit package database 602, a recipient profile database 604, a promotional recipient database 607, a matched order promotion server module 615, a package application module 618, a presentation module 622, and a promotion module 610. In-transit package database 602 is configured to store data describing in-transit packages being shipped via a freight carrier entity. The data may include, inter alia, package identification for packages pending a freight carrier sort process, etc. Recipient profile database 604 is configured to store package recipient profiles. Promotional recipient database 607 is configured for storing desired package recipient profiles, an associated quantity of packages delivered, price offers for packages, and package order time windows. In-transit package database 602, recipient profile database 604, and promotional recipient database 607 are configured to (in combination) provide input for executing a process for matching in-transit package recipients with established recipient profiles with respect to a package delivery stage. Likewise, desired recipient profiles are matched with in-transit package recipient profiles of package recipients that are not associated with a desired promotional entity. The matching process enables a process for promotional entity bidding with respect to available matching promotional structure package placement. Matched order promotion server 615 is configured to control all functionality associated with matching promotions with package orders. Package application module 618 is configured to control functionality for applying a physical promotional structure (e.g., a label such as a visible promotion or a QR code, a RFID tag etc. The physical promotional structure may be applied to the package at a specified location on the package. Package application module 618 may be further configured to track a package physically to a label printer or a QR code or RFID tag programming unit. Presentation module 622 is configured to present a specified promotion to a package recipient via, inter alia, a Web based tracking Page, a SMS, an email, etc. Promotion module 610 may be associated with a shipping entity. Alternatively, promotion module 610 may be associated with a non-shipping entity. Promotion module 610 is configured to provide a specified recipient demographic, a quantity of packages for delivery, a package delivery time window, a price or bid per promotion, current customer IDs, etc.

Figure 7:
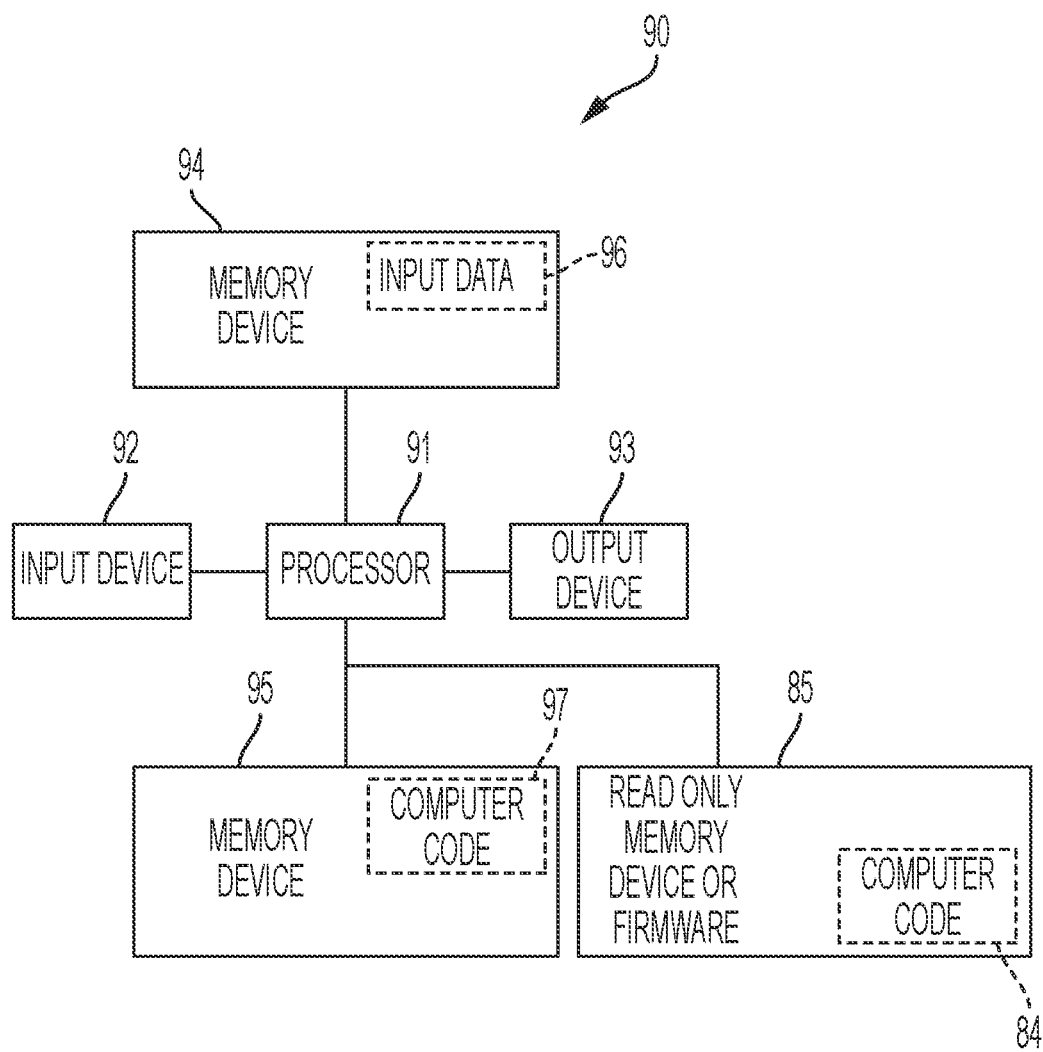
FIG. 7 illustrates a computer system used by the system of FIG. 1 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.

FIG. 7 illustrates a computer system 90 (e.g., freight carrier server 139, tracking system 139*a*, programming/application hardware 139*b*, shipping client systems 114, promotional entity systems 123, and/or recipient systems 119 of FIG. 1) used by or comprised by the system 100 of FIG. 1 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A server of a freight carrier entity comprising a processor coupled to a computer-readable memory unit, the memory unit comprising instructions that when executed by the processor implements an order based electronically generated promotion configuration and deployment method comprising:

receiving from a shipping client hardware system located external to said server of said freight carrier entity, by said processor, electronic data comprising shipment identification data for a shipment of at least one item from at least one shipping client to at least one recipient, a recipient name and address for said at least one recipient of at least one item, and description data associated with said at least one item;

generating, by said processor, specialized programable software code comprising an algorithm executing said order based electronically generated promotion configuration and deployment method with respect to said electronic data and records of items previously received by said at least one recipient;

generating, by said processor executing said specialized programable software code, at least one profile for said least one recipient of said at least one item, wherein said at least one profile comprises digital contact methods;

authorizing, by said processor in response to instructions from said at least one shipping client received via said shipping client hardware system, at least one further client via a hardware system located external to said server and said shipping client hardware system and associated with said freight carrier to electronically generate visible promotional structures associated with specified packages for delivery by said freight carrier;

cross referencing, by said processor in response to said authorizing and based on analysis of said at least one profile, promotional attributes, received from said at least one further client via said hardware system, with at least one package comprising said at least one item for said at least one recipient, wherein said cross referencing comprises:
tracking online item selection of said specified packages of said at least one further client; and
matching, in response to said tracking, demographic profiles, of a plurality of recipients of pending delivery packages, to additional demographic profiles selected by at least one authorized promotional entity for each pending delivery package of said pending delivery packages;

generating, by said processor for said at least recipient, at least one visible promotional structure associated with said promotional attributes, wherein said generating said at least one visible promotional structure comprises generating: a physical structure comprising at least one label comprising a visible promotion and attaching said at least one label to said at least one package and a digital structure embedded within a Web-based tracking page being presented to said at least one recipient via a hardware and software user interface; and deploying, by said processor to said at least one recipient, said at least one visible promotional structure during a delivery process of said at least one package.

2. The method of claim 1, wherein said at least one profile for said least one recipient comprises data selected from the group consisting of a type of company of said at least one shipping client, specified types of products associated with said at least one shipping client, a size of packages received by said at least one recipient, and a weight of packages received by said at least one recipient.

3. An order based electronically generated promotion configuration and deployment method comprising:

receiving, by a processor of a server of a freight carrier from a shipping client hardware system located external to said server of said freight carrier entity, electronic data comprising shipment identification data for a shipment of at least one item from at least one shipping client to at least one recipient, a recipient name and address for said at least one recipient of at least one item, and description data associated with said at least one item;

generating, by said processor, specialized programable software code comprising an algorithm executing said order based electronically generated promotion configuration and deployment method with respect to said electronic data and records of items previously received by said at least one recipient;

generating, by said processor executing said specialized programable software code, at least one profile for said least one recipient of said at least one item, wherein said at least one profile comprises digital contact methods;

authorizing, by said processor in response to instructions from said at least one shipping client received via said shipping client hardware system, at least one further client via a hardware system located external to said server and said shipping client hardware system and associated with said freight carrier to electronically generate visible promotional structures associated with specified packages for delivery by said freight carrier;

cross referencing, by said processor in response to said authorizing and based on analysis of said at least one profile, promotional attributes, received from said at least one further client via said hardware system, with at least one package comprising said at least one item for said at least one recipient, wherein said cross referencing comprises:
tracking online item selection of said specified packages of said at least one further client; and
matching, in response to said tracking, demographic profiles, of a plurality of recipients of pending delivery packages, to additional demographic profiles selected by at least one authorized promotional entity for each pending delivery package of said pending delivery packages;

generating, by said processor for said at least recipient, at least one visible promotional structure associated with said promotional attributes, wherein said generating said at least one visible promotional structure comprises generating: a physical structure comprising at least one label comprising a visible promotion and attaching said at least one label to said at least one package and a digital structure embedded within a Web-based tracking page being presented to said at least one recipient via a hardware and software user interface; and deploying, by said processor to said at least one recipient, said at least one visible promotional structure during a delivery process of said at least one package.

4. The method of claim 3, further comprising:

receiving from at said least one shipping client of said freight carrier via at least one interface, by said processor, opt in instructions comprising permission enabling at least one additional shipping client of said freight carrier to generate promotions in association with said at least one package.

5. The method of claim 3, wherein said description data associated with said item is comprised by a structure selected from the group consisting of a bar code structure, a universal product number (UPC) structure, stock keeping unit (SKU) code structure, and a radio frequency identification (RFID) structure.

6. The method of claim 3, wherein said generating said at least one visible promotional structure comprises:

enabling, said Web-based tracking page associated with said at least one package for allowing said at least one further client to promote a demographic associated with said at least one recipient via said Web-based tracking page;

matching additional authorized Web-based tracking pages for packages to a number of promotional structures associated with said at least one further client with respect to said demographic of said at least one recipient; and enabling a bidding process for said at least one shipping client and said at least one further client with respect to visible promotional placement with respect to said at least one package.

7. The method of claim 6, wherein said deploying said at least one visible promotional structure comprises presenting said at least one visible promotional structure via said Web-based tracking page for tracking a vehicle associated with delivery of said at least one package.

8. The method of claim 7, wherein said Web-based tracking page comprises a static tracking page for providing static type tracking information for said tracking said vehicle associated with said delivery of said at least one package.

9. The method of claim 7, wherein said Web-based tracking page comprises a dynamic tracking page for providing dynamic real time continuously updating tracking information for said at least one package, and wherein said at least one visible promotional structure comprises multiple differing promotions presented to said at least one recipient based on differing real-time locations of said vehicle associated with said delivery of said at least one package.

10. The method of claim 9, wherein said multiple differing promotions are associated with businesses located near to said differing real-time locations of said vehicle.

11. The method of claim 10, wherein geographical information associated with said businesses is retrieved from a database of known locations.

12. The method of claim 10, wherein geographical information associated with said businesses is detected via sensors of said vehicle as said vehicle is moving past said businesses.

13. The method of claim 3, wherein said generating said at least one visible promotional structure further comprises:

generating at least one label comprising a visible promotion for presentation to said at least one recipient, wherein said deploying said at least one visible promotional structure comprises applying said at least one label to said at least one package.

14. The method of claim 13, wherein said applying said at least one label to said at least one package comprises a manual process performed by a person.

15. The method of claim 13, wherein said applying said at least one label to said at least one package comprises an automated process performed by a machine.

16. The method of claim 3, wherein said generating said at least one visible promotional structure further comprises:

generating at least one label comprising a quick response (QR) code associated with a visible promotion for presentation to said at least one recipient, wherein said deploying said at least one visible promotional structure comprises enabling communications between said QR code and at least one mobile device of said at least one recipient such that said at least one mobile device presents said visible promotion to said at least one recipient.

17. The method of claim 3, wherein said generating said at least one visible promotional structure further comprises:

generating data associated with a visible promotion for presentation to said at least one recipient; and transferring said data to at least one radio frequency identification (RFID) tag, wherein said deploying said at least one visible promotional structure comprises:

applying said at least one RFID tag to said at least one package; and enabling communications between said at least one RFID tag and at least one mobile device of said at least one recipient such that said at least one mobile device presents said visible promotion to said at least one recipient.

18. The method of claim 3, wherein said electronic data is received from said freight carrier entity.

19. The method of claim 3, wherein said electronic data is received from said freight carrier from at least one portal system of said freight carrier, wherein said portal system comprises item order information associated with said at least one package for said at least one recipient or a carrier-operated imaging system configured to determine item attributes within a sealed package.

20. The method of claim 3, further comprising:

providing, by said processor, said demographic profiles and said additional demographic profiles to said at least one shipping client and said at least one further client.

21. The method of claim 3, further comprising:

enabling, by said processor in response to a command from further shipping clients, entities, associated with said further shipping clients, to provide said at least one visible promotional structure to at least one profiled package recipient associated with said further shipping clients and associated Web-based tracking pages.

22. The method of claim 21, wherein demographics of said at least one profiled package recipient are provided by said further shipping clients.

23. A computer program product, comprising a computer readable hardware storage device storing a computer readable program code, said computer readable program code comprising an algorithm that when executed by a processor of a server of a freight carrier entity implements an order based electronically generated promotion configuration and deployment method, said method comprising:

receiving from a shipping client hardware system located external to said server of said freight carrier entity, by said processor, electronic data comprising shipment identification data for a shipment of at least one item from at least one shipping client to at least one recipient, a recipient name and address for said at least one recipient of at least one item, and description data associated with said at least one item;

generating, by said processor, specialized programable software code comprising an algorithm executing said order based electronically generated promotion configuration and deployment method with respect to said electronic data and records of items previously received by said at least one recipient;

generating, by said processor executing said specialized programable software code, at least one profile for said least one recipient of said at least one item, wherein said at least one profile comprises digital contact methods;

authorizing, by said processor in response to instructions from said at least one shipping client received via said shipping client hardware system, at least one further client via a hardware system located external to said server and said shipping client hardware system and associated with said freight carrier to electronically generate visible promotional structures associated with specified packages for delivery by said freight carrier;

cross referencing, by said processor in response to said authorizing and based on analysis of said at least one profile, promotional attributes, received from said at least one further client via said hardware system, with at least one package comprising said at least one item for said at least one recipient, wherein said cross referencing comprises:
  tracking online item selection of said specified packages of said at least one further client; and
  matching, in response to said tracking, demographic profiles, of a plurality of recipients of pending delivery packages, to additional demographic profiles selected by at least one authorized promotional entity for each pending delivery package of said pending delivery packages;

generating, by said processor for said at least recipient, at least one visible promotional structure associated with said promotional attributes, wherein said generating said at least one visible promotional structure comprises generating: a physical structure comprising at least one label comprising a visible promotion and attaching said at least one label to said at least one package and a digital structure embedded within a Web-based tracking page being presented to said at least one recipient via a hardware and software user interface; and deploying, by said processor to said at least one recipient, said at least one visible promotional structure during a delivery process of said at least one package.

24. A server of a freight carrier entity comprising a processor coupled to a computer-readable memory unit, the memory unit comprising instructions that when executed by the processor implements an order based electronically generated promotion configuration and deployment method comprising:

receiving from a shipping client hardware system located external to said server of said freight carrier entity, by said processor, electronic data comprising shipment identification data for a shipment of at least one item from at least one shipping client to at least one recipient, a recipient name and address for said at least one recipient of at least one item, and description data associated with said at least one item;

generating, by said processor, specialized programable software code comprising an algorithm executing said order based electronically generated promotion configuration and deployment method with respect to said electronic data and records of items previously received by said at least one recipient;

generating, by said processor executing said specialized programable software code, at least one profile for said least one recipient of said at least one item, wherein said at least one profile comprises digital contact methods;

authorizing, by said processor in response to instructions from said at least one shipping client received via said shipping client hardware system, at least one further client via a hardware system located external to said server and said shipping client hardware system and associated with said freight carrier to electronically generate visible promotional structures associated with specified packages for delivery by said freight carrier;

cross referencing, by said processor in response to said authorizing and based on analysis of said at least one profile, promotional attributes, received from said at least one further client via said hardware system, with at least one package comprising said at least one item for said at least one recipient, wherein said cross referencing comprises:
  tracking online item selection of said specified packages of said at least one further client; and
  matching, in response to said tracking, demographic profiles, of a plurality of recipients of pending delivery packages, to additional demographic profiles selected by at least one authorized promotional entity for each pending delivery package of said pending delivery packages;

generating, by said processor for said at least recipient, at least one visible promotional structure associated with said promotional attributes, wherein said generating said at least one visible promotional structure comprises generating: a digital structure embedded within a Web-based tracking page being presented to said at least one recipient via a hardware and software user interface; and deploying, by said processor to said at least one recipient, said at least one visible promotional structure during a delivery process of said at least one package.

* * * * *